US009179415B2

United States Patent
Kim et al.

(10) Patent No.: US 9,179,415 B2
(45) Date of Patent: Nov. 3, 2015

(54) UPLINK CONTROL CHANNEL TRANSMISSION CONTROL METHOD IN A MULTI-CARRIER SYSTEM AND TERMINAL USING SAME

(75) Inventors: Min Gyu Kim, Anyang-si (KR); Suck Chel Yang, Anyang-si (KR); Joon Kui Ahn, Anyang-si (KR); Dong Youn Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 180 days.

(21) Appl. No.: 13/806,025

(22) PCT Filed: Jun. 20, 2011

(86) PCT No.: PCT/KR2011/004493
§ 371 (c)(1),
(2), (4) Date: Dec. 20, 2012

(87) PCT Pub. No.: WO2011/162521
PCT Pub. Date: Dec. 29, 2011

(65) Prior Publication Data
US 2013/0094466 A1  Apr. 18, 2013

Related U.S. Application Data

(60) Provisional application No. 61/357,079, filed on Jun. 21, 2010.

(51) Int. Cl.
*H04B 7/185* (2006.01)
*H04B 7/00* (2006.01)
*H04W 52/14* (2009.01)
*H04W 52/32* (2009.01)
*H04W 72/04* (2009.01)
*H04W 52/58* (2009.01)
*H04W 52/34* (2009.01)

(52) U.S. Cl.
CPC .......... *H04W 52/146* (2013.01); *H04W 52/325* (2013.01); *H04W 52/58* (2013.01); *H04W 72/0413* (2013.01); *H04W 52/34* (2013.01)

(58) Field of Classification Search
None
See application file for complete search history.

(56) References Cited

U.S. PATENT DOCUMENTS 6,760,598 B1 * 7/2004 Kurjenniemi ................. 455/522
7,627,336 B2 * 12/2009 Carlsson et al. .............. 455/522
(Continued)

FOREIGN PATENT DOCUMENTS

KR  10-2006-0116011 A  11/2006
KR  10-2008-0036239 A  4/2008
(Continued)

*Primary Examiner* — Marsha D. Banks Harold
*Assistant Examiner* — Christopher Wyllie
(74) *Attorney, Agent, or Firm* — Birch, Stewart, Kolasch & Birch, LLP

(57) ABSTRACT

Provided is a transmission power control method for an uplink control channel of a terminal in a multi-carrier system where a plurality of downlink component carriers and at least one uplink component carrier are set in the terminal. The method includes: receiving a plurality of downlink grants from a base station; checking a Transmission Power Command (TPC) field included in each of the plurality of downlink grants; determining a transmission power of an uplink control channel (PUCCH) with a value of the checked TPC field; and transmitting the uplink control channel at the determined transmission power, with one configured uplink component carrier among the at least one uplink component carrier.

7 Claims, 12 Drawing Sheets

(56) References Cited

U.S. PATENT DOCUMENTS

| | | | |
|---|---|---|---|
| 7,745,010 B2 | 6/2010 | Schneider | |
| 8,200,230 B2* | 6/2012 | Nystrom et al. | 455/442 |
| 8,472,368 B2* | 6/2013 | Baldemair et al. | 370/318 |
| 8,498,259 B2* | 7/2013 | Suzuki et al. | 370/329 |
| 8,705,396 B2* | 4/2014 | Ahn et al. | 370/252 |
| 9,042,357 B2* | 5/2015 | Seo et al. | 370/337 |
| 2008/0207247 A1* | 8/2008 | Gholmieh et al. | 455/522 |
| 2009/0318179 A1* | 12/2009 | Satou | 455/522 |
| 2011/0038271 A1* | 2/2011 | Shin et al. | 370/252 |
| 2011/0044222 A1* | 2/2011 | Gerstenberger et al. | 370/311 |
| 2011/0141985 A1* | 6/2011 | Larsson et al. | 370/329 |
| 2011/0243087 A1* | 10/2011 | Ahn et al. | 370/329 |
| 2011/0274064 A1* | 11/2011 | Luo et al. | 370/329 |
| 2011/0292887 A1* | 12/2011 | Baldemair et al. | 370/329 |
| 2012/0087334 A1* | 4/2012 | Suzuki et al. | 370/329 |
| 2012/0300727 A1* | 11/2012 | Kim et al. | 370/329 |
| 2013/0039307 A1* | 2/2013 | Han et al. | 370/329 |
| 2014/0056251 A1* | 2/2014 | Ahn et al. | 370/329 |

FOREIGN PATENT DOCUMENTS

| | | |
|---|---|---|
| KR | 10-2009-0097805 A | 9/2009 |
| KR | 10-2010-0073976 A | 7/2010 |

\* cited by examiner

FIG. 6

| DCI Format 3 | UE1 TPC(2bit) | UE2 TPC(2bit) | UE3 TPC(2bit) | UE4 TPC(2bit) | UE5 TPC(2bit) | UE6 TPC(2bit) | UE7 TPC(2bit) | UE8 TPC(2bit) | UE9 TPC(2bit) | UE10 TPC(2bit) | XP |

| DCI Format 3A | TPC | TPC | TPC | TPC | TPC | TPC | TPC | TPC | TPC | TPC | TPC | TPC | TPC | TPC | TPC | TPC | TPC | TPC | TPC | TPC | TPC |

# UPLINK CONTROL CHANNEL TRANSMISSION CONTROL METHOD IN A MULTI-CARRIER SYSTEM AND TERMINAL USING SAME

CROSS REFERENCE TO RELATED APPLICATIONS

This application is the National Phase of PCT/KR2011/004493 filed on Jun. 20, 2011, which claims priority under 35 U.S.C. 119(e) to U.S. Provisional Application No. 61/357,079 filed on Jun. 21, 2010, all of which are hereby expressly incorporated by reference into the present application.

TECHNICAL FIELD

The present invention relates to wireless communication and, more specifically, to a method of controlling the transmission power of an uplink control channel in a multi-carrier system and a mobile station using the method.

BACKGROUND ART

One of the most important requirements of the next-generation wireless communication system is to support requirements for a high data transfer rate. To this end, research is being carried out on various technologies, such as Multiple Input Multiple Output (MIMO) and Cooperative Multiple Point transmission (CoMP), and a relay, but the most basic and stable solution is to increase the bandwidth.

However, frequency resources are now in the saturation state, and various technologies are partially being used in wide-ranging frequency bands. For this reason, as a scheme for securing a wide bandwidth in order to satisfy requirements for a higher data transfer rate, a Carrier Aggregation (CA) having a concept that each of scattered bands is designed to satisfy a basic requirement capable of operating an independent system and a number of bands are bundled into one system is being introduced. Here, a band that may be independently operated is defined as a Component Carrier (CC).

In a recent communication standard, for example, a standard, such as 3GPP LTE-A or 802.16m, the extension of a 20 MHz or higher bandwidth is taken into consideration. In this case, a broadband is supported by aggregating one or more CCs. For example, if one CC corresponds to a bandwidth of 5 MHz, a bandwidth of a maximum of 20 MHz is supported by aggregating four carriers. A system using a CA as described above is called a multi-carrier system.

In a multi-carrier system, a plurality of CCs can be used in downlink and uplink. Accordingly, a plurality of downlink grants for a plurality of downlink CCs (DL CCs) can be transmitted. The DL grant can include a scheduling message for each DL CC and a Transmission Power Field (TPC) for an uplink channel. In a multi-carrier system, however, although a plurality of uplink CCs (UL CCs) is configured in a mobile station, an uplink control channel can be transmitted through only one UL CC. In this case, if TPC fields included in the plurality of DL grants have different values, there is a problem in that a mobile station will determine transmission power for the uplink control channel using what method.

In a multi-carrier system, there is a need for a method of a mobile station controlling the transmission power of an uplink control channel and a mobile station using the method.

DISCLOSURE

Technical Problem

An object of the present invention is to provide a method of controlling the transmission power of an uplink control channel in a multi-carrier system and a mobile station using the method.

Technical Solution

A method of a mobile station controlling the transmission power for an uplink control channel in a multi-carrier system in which a plurality of downlink Component Carriers (DL CCs) and at least one uplink component carrier (UL CC) are configured for the mobile station in accordance with an aspect of the present invention includes the steps of receiving a plurality of DL grants from a base station; testing Transmission Power Command (TPC) fields included in the plurality of DL grants, respectively; determining the transmission power of the uplink control channel (PUCCH) using a value of a TPC field through which the test has passed; and transmitting the uplink control channel using the determined transmission power through one configured UL CC among the at least one UL CC.

The method may further include the step of receiving configuration information, indicating the sign or value of each of the TPC fields included in the plurality of DL grants, respectively, from the base station.

The TPC fields included in the plurality of DL grants, respectively, may be set to have the same sign or a '0' value, and the sign may indicate a positive value or negative value.

The transmission power of the uplink control channel may be determined by adding only the values of TPC fields each having the same sign as that indicated by the configuration information, from among the TPC fields included in the plurality of DL grants, respectively.

The transmission power of the uplink control channel may be determined by adding only the values of TPC fields each having a value included in a value indicated by the configuration information, from among the TPC fields included in the plurality of DL grants, respectively.

The plurality of DL grants may be received through a monitoring DL CC on which the mobile station monitors a physical downlink control channel (PDCCH), from among the plurality of DL CCs.

The monitoring DL CC may be a DL CC linked to an UL CC that transmits the uplink control channel.

The monitoring DL CC may include two or more of the plurality of DL CCs, and some of the plurality of DL grants may be received through each of the two or more DL CCs.

The TPC fields included in the plurality of DL grants, respectively, may be set to have the same value.

A mobile station in a multi-carrier system in which a plurality of downlink Component Carriers (DL CCs) and at least one uplink component carrier (UL CC) are configured for the mobile station in accordance with another aspect of the present invention includes a Radio Frequency (RF) unit transmitting and receiving radio signals and a processor connected to the RF unit, wherein the processor receives a plurality of DL grants from a base station, tests Transmission Power Command (TPC) fields included in the plurality of DL grants, respectively, determines the transmission power of the uplink control channel (PUCCH) using a value of a TPC field through which the test has passed, and transmits the uplink control channel using the determined transmission power through one configured UL CC among the at least one UL CC.

The processor may further receive configuration information, indicating the sign or value of each of the TPC fields included in the plurality of DL grants, respectively, from the base station.

The TPC fields included in the plurality of DL grants, respectively, may be set to have the same sign or a '0' value, and the sign may indicate a positive value or negative value.

The processor may determine the transmission power of the uplink control channel by adding only the values of TPC fields each having the same sign as that indicated by the configuration information, from among the TPC fields included in the plurality of DL grants, respectively.

The processor may determine the transmission power of the uplink control channel by adding only the values of TPC fields each having a value included in a value indicated by the configuration information, from among the TPC fields included in the plurality of DL grants, respectively.

The plurality of DL grants may be received through a monitoring DL CC on which the mobile station monitors a physical downlink control channel (PDCCH), from among the plurality of DL CCs.

Advantageous Effects

In accordance with the present invention, the range of the coordination of transmission power for an uplink control channel in a multi-carrier system can be increased as compared with a conventional single carrier system, and more delicate transmission power control is possible because a transmission power coordination unit for an uplink control channel can be made fine.

BRIEF DESCRIPTION OF THE DRAWINGS

FIG. 6 illustrates DCI formats 3/3A.

MODE FOR INVENTION

The following technologies may be used in a variety of multiple access schemes, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA may be implemented using radio technology, such as Universal Terrestrial Radio Access (UTRA) or CDMA2000. TDMA may be implemented using radio technology, such as Global System for Mobile communications (GSM)/General Packet Radio Service (GPRS)/Enhanced Data Rates for GSM Evolution (EDGE). OFDMA may be implemented using radio technology, such as Institute of Electrical and Electronics Engineers (IEEE) 802.11 (Wi-Fi), IEEE 802.16 (WiMAX), IEEE 802.20, or Evolved UTRA (E-UTRA). IEEE 802.16m is an evolution of IEEE 802.16e, and it provides backward compatibility with systems based on IEEE 802.16e. UTRA is part of a Universal Mobile Telecommunications System (UMTS). $3^{rd}$ Generation Partnership Project (3GPP) Long Term Evolution (LTE) is part of an Evolved UMTS (E-UMTS) using E-UTRA, and it adopts OFDMA in downlink and adopts SC-FDMA in uplink. LTE-Advanced (LTE-A) is the evolution of LTE.

In order to clarify a description, a situation in which the present invention is applied to LTE/LTE-A systems is assumed and described, but the technical spirit of the present invention is not limited thereto.

Figure 1:
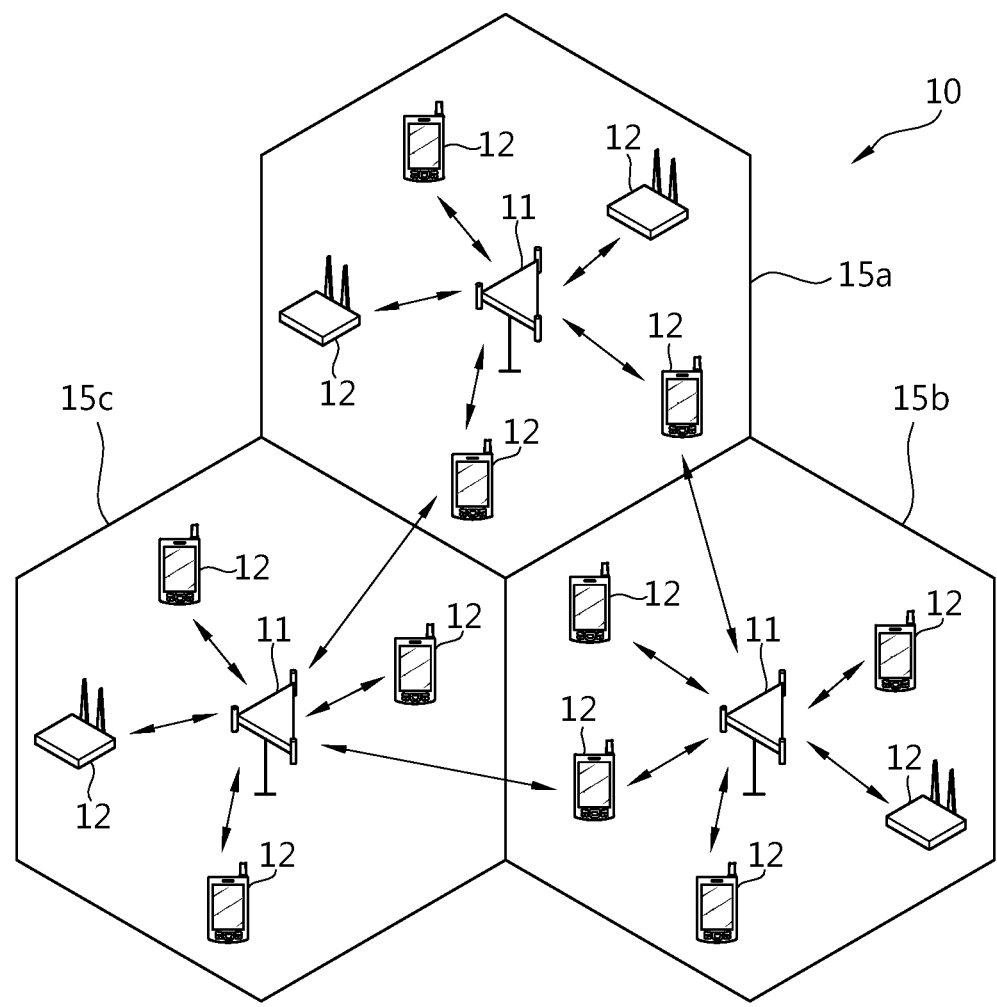
FIG. 1 shows a wireless communication system.

FIG. 1 shows a wireless communication system.

Referring to FIG. 1, the wireless communication system 10 includes one or more Base Stations (BSs) 11. The BSs 11 provide communication services to specific geographical areas, commonly called cells, 15a, 15b, and 15c. Each of the cells may be divided into a plurality of areas, and each of the areas is called a sector. In general, the BS 11 refers to a fixed station that communicates with UEs 13, and it may also be called another terminology, such as an evolved NodeB (eNB), a Base Transceiver System (BTS), an access point, or an Access Network (AN).

The User Equipment (UE) 12 may be fixed or mobile and may also be called another terminology, such as a Mobile Station (MS), a User Terminal (UT), a Subscriber Station (SS), a wireless device, a Personal Digital Assistant (PDA), a wireless modem, a handheld device, or an Access Terminal (AT).

downlink (DL) refers to communication from the BS 11 to the UE 12, and uplink (UL) refers to communication from the UE 12 to the BS 11.

The wireless communication system 10 may be a system which supports bidirectional communication. Bidirectional communication can be performed using Time Division Duplex (TDD) mode, Frequency Division Duplex (FDD) mode or the like. TDD mode using different time resources in UL transmission and DL transmission. FDD mode uses different frequency resources in UL transmission and DL transmission. The BS 11 and the UE 12 communicate with each other using radio resources called radio frames.

Figure 2:
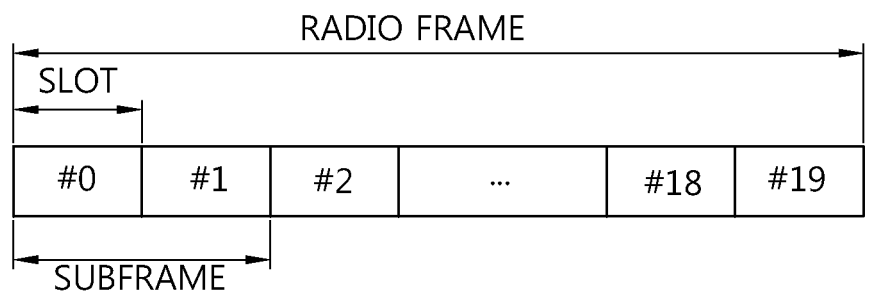
FIG. 2 shows the structure of a radio frame.

FIG. 2 shows the structure of a radio frame.

Referring to FIG. 2, the radio frame includes 10 subframes, and one subframe includes two slots. The length of one subframe may be 1 ms, and the length of one slot may be 0.5 ms. The time that it takes to transmit one subframe is called a Transmission Time Interval (TTI). The TTI may be a minimum scheduling unit.

One slot may include a plurality of Orthogonal Frequency Division Multiplexing (OFDM) symbols in the time domain. The OFDM symbol is used to represent one symbol period because 3GPP LTE uses OFDMA in downlink and may be called another terminology according to a multiple access scheme. For example, if SC-FDMA is used as an uplink multiple access scheme, corresponding symbols may be called SC-FDMA symbols. One slot is illustrated as including 7 OFDM symbols, but the number of OFDM symbols included in one slot may be changed depending on the length of a Cyclic Prefix (CP). In accordance with 3GPP TS 36.211

V8.5.0 (2008 December), 1 subframe includes 7 OFDM symbols in a normal CP, and 1 subframe includes 6 OFDM symbols in an extended CP. The structure of the radio frame is only an example, and the number of subframes included in the radio frame and the number of slots included in the subframe may be changed in various ways.

Figure 3:
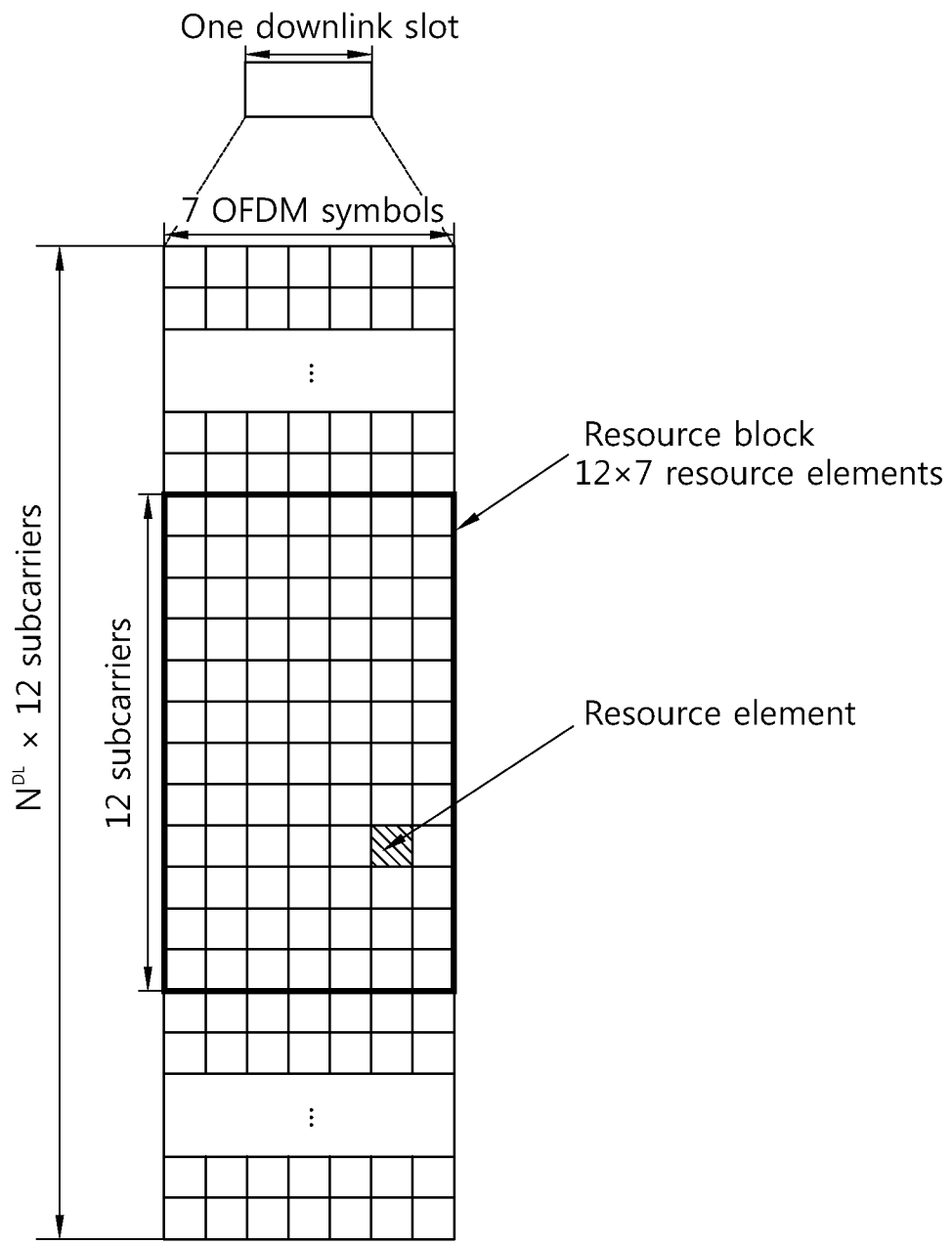
FIG. 3 shows an example of a resource grid for one downlink slot.

FIG. 3 shows an example of a resource grid for one downlink slot.

Referring to FIG. 3, the downlink slot includes a plurality of OFDM symbols in the time domain and includes $N_{RB}$ Resource Blocks (RBs) in the frequency domain. The resource block is a resource allocation unit, and it includes one slot in the time domain and includes a plurality of contiguous subcarriers in the frequency domain.

The number of resource blocks $N_{RB}$ included in a downlink slot depends on a downlink transmission bandwidth configured in a cell. For example, in an LTE system, the number of resource blocks $N_{RB}$ may be any one of 6 to 110. An uplink slot may have the same structure as the downlink slot.

Each of elements on the resource grid is called a Resource Element (RE). The resource elements on the resource grid may be identified by an index pair (k, l) within a slot. Here, $k(k=0, \ldots, N_{RB} \times 12-1)$ indicates a subcarrier index in the frequency domain, and $l(l=0, \ldots, 6)$ indicates an OFDM symbol index in the time domain.

In FIG. 3, one resource block is illustrated as including 7×12 resource elements, including 7 OFDM symbols in the time domain and 12 subcarriers in the frequency domain. However, the number of OFDM symbols and the number of subcarriers within a resource block are not limited thereto. The number of OFDM symbols and the number of subcarriers may be changed in various ways depending on the length of a CP, frequency spacing, etc. For example, the number of OFDM symbols is 7 in case of a normal CP, and the number of OFDM symbols is 6 in case of an extended CP. One of 128, 256, 512, 1024, 1536, and 2048 may be selected and used as the number of subcarriers in one OFDM symbol.

Figure 4:
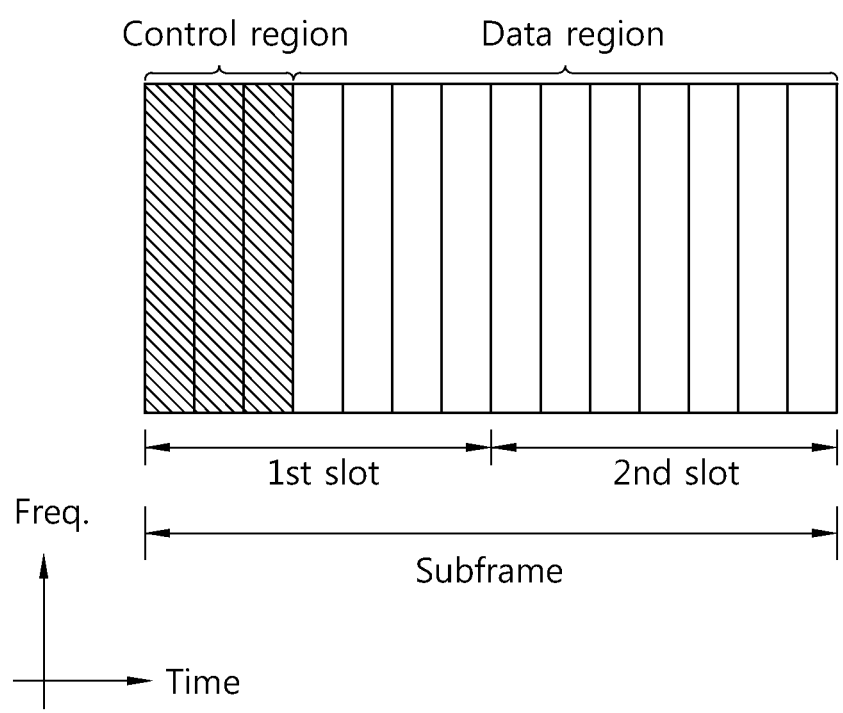
FIG. 4 shows the structure of a downlink subframe.

FIG. 4 shows the structure of a downlink subframe.

The downlink subframe includes two slots in the time domain, and each of the slots includes 7 OFDM symbols in a normal CP. A maximum of the former 3 OFDM symbols (a maximum of 4 OFDM symbols in a 1.4 MHz bandwidth) of the first slot within the subframe correspond to a control region to which control channels are allocated, and the remaining OFDM symbols correspond to a data region to which a Physical Downlink Shared Channel (PDSCH) is allocated. The PDSCH means a channel on which a BS transmits data to an MS.

A PDCCH, that is, one of control channels, can carry the resource allocation and transport format of a Downlink-Shared Channel (DL-SCH) (this is also called a downlink grant (DL grant)), information about the resource allocation of an Uplink Shared Channel (UL-SCH) (this is also called an uplink grant (UL grant)), paging information about a paging channel (PCH), system information about a DL-SCH, the resource allocation of a higher layer control message, such as a random access response transmitted on a PDSCH, a set of Transmission Power Control (TPC) commands for respective UEs within a specific UE group, the activation of a Voice over Internet Protocol (VoIP), and so on. The pieces of control information transmitted on the above-described PDCCH are called Downlink Control Information (DCI). DCI has a variety of formats, which are described later.

Figure 5:
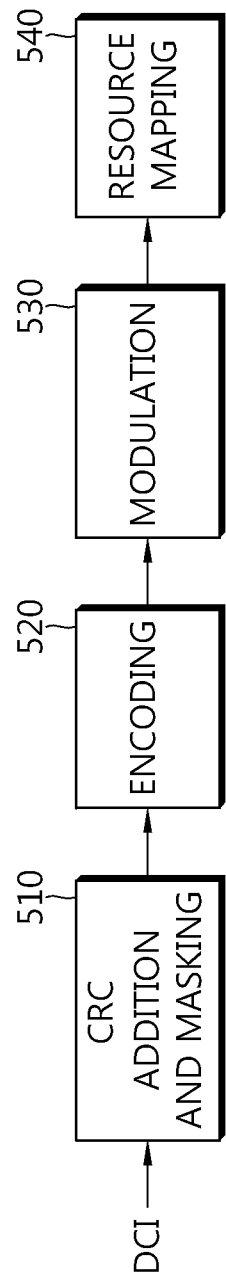
FIG. 5 is a block diagram showing the construction of DCI that is transmitted in a PDCCH.

FIG. 5 is a block diagram showing the construction of DCI that is transmitted in a PDCCH.

A BS determines a PDCCH format (i.e., the number of Control Channel Elements (CCEs), the number of Resource Element Groups (REGs), the number of bits, etc. included in a PDCCH) depending on DCI that will be transmitted to an MS, attaches Cyclic Redundancy Check (CRC) to the DCI, and masks a unique identifier (this is called a Radio Network Temporary Identifier (RNTI)) to the CRC depending on the owner or use of the PDCCH (510).

If DCI is DCI for a specific MS, an identifier unique to the MS, for example, a Cell-RNTI (C-RNTI) can be masked to CRC. Or, if DCI is DCI for a paging message, a paging indication identifier, for example, a Paging-RNTI (P-RNTI) can be masked to CRC. If DCI is DCI for system information, a system information identifier, a System Information-RNTI (SI-RNTI) can be masked to CRC. In order to indicate a random access response, that is, a response to the transmission of the random access preamble of UE, a Random Access-RNTI (RA-RNTI) can be masked to CRC.

If a C-RNTI is used, DCI carries control information about specific UE (this is called UE-specific control information). If an RNTI is used, DCI carries common control information that is received by all of a plurality of MSs within a cell.

Coded data is generated by encoding the DCI to which the CRC has been added (520). The encoding includes channel encoding and rate matching. The coded data is modulated into modulation symbols (530). The modulation symbols are mapped to physical Resource Elements (REs) (540).

The existing DCI formats transmitted on a PDCCH are described below.

A DCI format includes fields to be described below, and the fields may be mapped to information bits $a_0$ to $a_{A-1}$. The fields may be mapped in order that they are described in the DCI formats, and each of the fields may include a '0' padding bit. The first field may be mapped to the information bit $a_0$ having the lowest order, and the remaining consecutive fields may be mapped to information bits of a higher order. The Most Significant Bit (MSB) in each field may be mapped to an information bit having the lowest order in the corresponding field. For example, the MSB in the first field may be mapped to $a_0$. A set of fields in which each of the existing DCI formats is included is called an information field.

1. DCI Format 0

The DCI format 0 is used for physical uplink shared channel (PUSCH) scheduling. Pieces of information (fields) transmitted through the DCI format 0 are as follows.

1) A flag for distinguishing the DCI format 0 and a DCI format 1A from each other (when the flag is 0, it indicates the DCI format 0, and when the flag is 1, it indicates the DCI format 1A), 2) a hopping flag (1 bit), 3) The designation of a resource block and the allocation of hopping resources, 4) a modulation and coding scheme and a redundancy version (5 bits), 5) a new data indicator (1 bit), 6) a TPC command for a scheduled PUSCH (2 bits), 7) a cyclic shift for a DM-RS (3 bits), 8) an UL index, 9) a downlink designation index (only in TDD), 10) a CQI request, etc. If the number of information bits is smaller than the payload size of the DCI format 1A in the DCI format 0, the DCI format 1A and the payload size are padded to '0' so that they become equal to each other.

2. DCI Format 1

The DCI format 1 is used for the scheduling of one PDSCH codeword. The following pieces of information are transmitted in the DCI format 1.

1) A resource allocation header (indicating a resource allocation type 0/type 1)—when a downlink bandwidth is smaller than 10 PRBs, the resource allocation header is not included and is assumed to be the resource allocation type 0. 2) The designation of a resource block, 3) a modulation and coding scheme, 4) an HARQ processor number, 5) a new data indicator, 6) a redundancy version, 7) a TPC command for a physical uplink control channel (PUCCH), 8) a downlink designation index (only in TDD), etc. If the number of information bits of the DCI format 1 is equal to that of the DCI formats 0/1A, 1 bit having a '0' value is added to the DCI format 1. In the DCI format 1, if the number of information bits is equal to any one of {12, 14, 16, 20, 24, 26, 32, 40, 44, 56}, a bit having one or more '0' values is added to the DCI format 1 so that the DCI format 1 has a value different from the {12, 14, 16, 20, 24, 26, 32, 40, 44, 56} and a payload size different from the payload size of the DCI formats 0/1A.

3. DCI Format 1A

The DCI format 1A is used for the compact scheduling of one PDSCH codeword and for a random access process.

The following pieces of information are transmitted in the DCI format 1A: 1) A flag for distinguishing the DCI format 0 and the DCI format 1A from each other, 2) a localized/distributed VRB designation flag, 3) the designation of a resource block, 4) a modulation and coding scheme, 5) an HARQ processor number, 6) a new data indicator, 7) a redundancy version, 8) a TPC command for a PUCCH, 9) a downlink designation index (only in TDD, etc. If the number of information bits of the DCI format 1A is smaller than the number of information bits of the DCI format 0, bits having a '0' value are added so that the DCI format 0 has the same payload size as the DCI format 0. In the DCI format 1A, if the number of information bits is equal to any one of {12, 14, 16, 20, 24, 26, 32, 40, 44, 56}, a bit having one '0' value is added to the DCI format 1A.

4. DCI Format 1B

The DCI format 1B includes precoding information, and it is used for compact scheduling for one PDSCH codeword. The following pieces of information are transmitted in the DCI format 1B.

1) A localized/distributed VRB designation flag, 2) the designation of a resource block, 3) a modulation and coding scheme, 4) HARQ processor number, 5) a new data indicator, 6) a redundancy version, 7) a redundancy version for a PUCCH, 8) a downlink designation index (only in TDD), 9) information about a Transmitted Precoding Matrix Indicator (TPMI) for precoding, 10) a PMI check for precoding, etc. If the number of information bits of the DCI format 1B is equal to any one of {12, 14, 16, 20, 24, 26, 32, 40, 44, 56}, a bit having one '0' value is added to the DCI format 1B.

5. DCI Format 1C

The DCI format 1C is used for very compact scheduling for one PDSCH codeword. The following pieces of information are transmitted in the DCI format 1C.

1) An indicator indicating a gap value, 2) the designation of a resource block, 3) a transport block size index, etc.

6. DCI Format 1D

The DCI format 1D includes information about precoding and a power offset, and it is used for compact scheduling for one PDSCH codeword. The following pieces of information are transmitted in the DCI format 1D.

1) A localized/distributed VRB designation flag, 2) the designation of a resource block, 3) a modulation and coding scheme, 4) HARQ processor number, 5) a new data indicator, 6) a redundancy version, 7) a TPC command for a PUCCH, 8) a downlink designation index (only in TDD), 9) information about a TPMI for precoding, 10) a downlink power offset, etc. If the number of information bits of the DCI format 1D is equal to any one of {12, 14, 16, 20, 24, 26, 32, 40, 44, 56}, a bit having one '0' value is added to the DCI format 1D.

7. DCI Format 2

The DCI format 2 is used to designate a PDSCH for a closed-loop MIMO operation. The following pieces of information are transmitted in the DCI format 2.

1) A resource allocation header, 2) the designation of a resource block, 3) a TPC command for a PUCCH, 4) a downlink designation index (only in TDD), 5) an HARQ processor number, 6) a transport block to codeword swap flag, 7) a modulation and coding scheme, 8) a new data indicator, 9) a redundancy version, 10) precoding information, etc.

8. DCI Format 2A

The DCI format 2A is used to designate a PDSCH for an open-loop MIMO operation. The following pieces of information are transmitted in the DCI format 2A.

1) A resource allocation header, 2) a TPC command for a PUCCH, 3) a downlink designation flag (only in TDD), 4) an HARQ processor number, 5) a transport block to codeword swap flag, 6) a modulation and coding scheme, 7) a new data indicator, 8) a redundancy version, 9) a precoding information, etc.

In addition, DCI formats include a DCI format 3 and a DCI format 3A.

FIG. 6 illustrates DCI formats 3/3A.

Referring to FIG. 6, the DCI format 3 is used to transmit TPC commands for a PUCCH and a PUSCH to each MS through power coordination of 2 bits. The following information is transmitted in the DCI format 3.

1) N Transmission Power Control (TPC) commands. Here, N is determined by Equation 1 below.

$$N = \left\lfloor \frac{L_{format0}}{2} \right\rfloor \quad \text{[Equation 1]}$$

In Equation 1, $L_{format0}$ is equal to the payload size of the DCI format 0 before CRC is attached to the DCI format 0. If a floor $L_{format0}/2$ is smaller than ($L_{format0}/2$), 1 bit having a '0' value is added. A parameter 'tpc-index' provided in the form of a higher layer signal determines an index for a TPC command for a given MS. That is, an MS can identify its own TPC field in the DCI format 3 that includes a plurality of TPC fields through the parameter 'tpc-index'.

The DCI format 3A is used to transmit a TPC command for a PUCCH and a PUSCH for each MS through power coordination of 1 bit. The following information is transmitted in the DCI format 3A.

1) M TPC commands. Here, M=$L_{format0}$ AND M is equal to the payload size of the DCI format 0 before CRC is attached to the DCI format 0. A parameter 'tpc-index' provided in the form of a higher layer signal determines an index for a TPC command for a given MS. That is, the MS can identify its own TPC field in the DCI format 3A that includes a plurality of TPC fields through the parameter 'tpc-index'.

The DCI formats 3/3A may be used for PUSCH transmission power coordination if a 'TPC-PUSCH-RNTI' is masked with CRC and may be used for PUCCH transmission power coordination if a 'TPC-PUCCH-RNTI' is masked with CRC.

Figure 7:
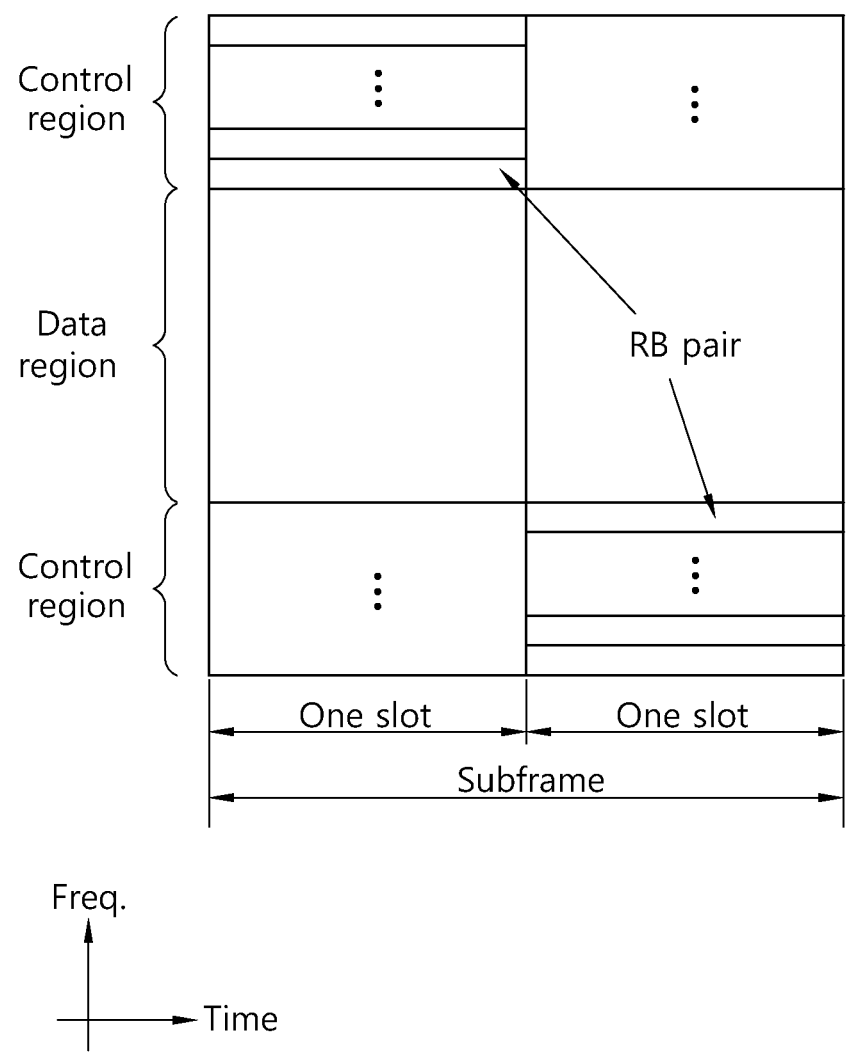
FIG. 7 shows the structure of an uplink subframe.

FIG. 7 shows the structure of an uplink subframe.

Referring to FIG. 7, the uplink subframe may be divided into a control region and a data region in the frequency domain. A physical uplink control channel (PUCCH) on which UL control information will be transmitted is allocated to the control region. A physical uplink shared channel (PUSCH) on which data (control information may also be transmitted according to circumstances) will be transmitted is allocated to the data region. An MS may transmit a PUCCH and a PUSCH at the same time or may transmit any one of a PUCCH and a PUSCH depending on a configuration.

A PUCCH for one MS is allocated in the form of a Resource Block (RB) pair in a subframe. RBs belonging to the RB pair occupy different subcarriers in a first slot and a second slot. A frequency occupied by the RB that belong to the RB pair allocated to the PUCCH is changed on the basis of a slot boundary. This is said that the RB pair allocated to the PUCCH has been frequency-hopped in the slot boundary. An MS can obtain a frequency diversity gain by transmitting UL control information through different subcarriers over time.

Hybrid Automatic Repeat reQuest (HARQ) Acknowledgement (ACK)/Non-acknowledgement (NACK) and Channel Status Information (CSI) indicating a downlink channel state, such as a Channel Quality Indicator (CQI), a Precoding Matrix Index (PMI), a Precoding Type Indicator (PTI), and a Rank Indicator (RI), can be transmitted on a PUCCH. Periodic CSI can be transmitted through a PUCCH.

A PUSCH is mapped to an uplink shared channel (UL-SCH), that is, a transport channel. Uplink data transmitted on a PUSCH may be a transport block, that is, a data block for an UL-SCH that is transmitted for a TTI. The transport block may include user data. Or, the uplink data may be multiplexed data. The multiplexed data may be obtained by multiplexing a transport block for an UL-SCH and CSI. For example, CSI multiplexed with data may include a CQI, a PMI, an RI, etc. Or, the uplink data may include only CSI.

Meanwhile, a 3GPP LTE-A system may be a multi-carrier system. The multi-carrier system means a system that forms a broadband by aggregating one or more carriers, each having a smaller bandwidth than a broadband, that is, a target when a wireless communication system tries to support a broadband. The multi-carrier system may be called another terminology, such as a Carrier Aggregation (CA) system, a bandwidth aggregation system, or the like.

Figure 8:
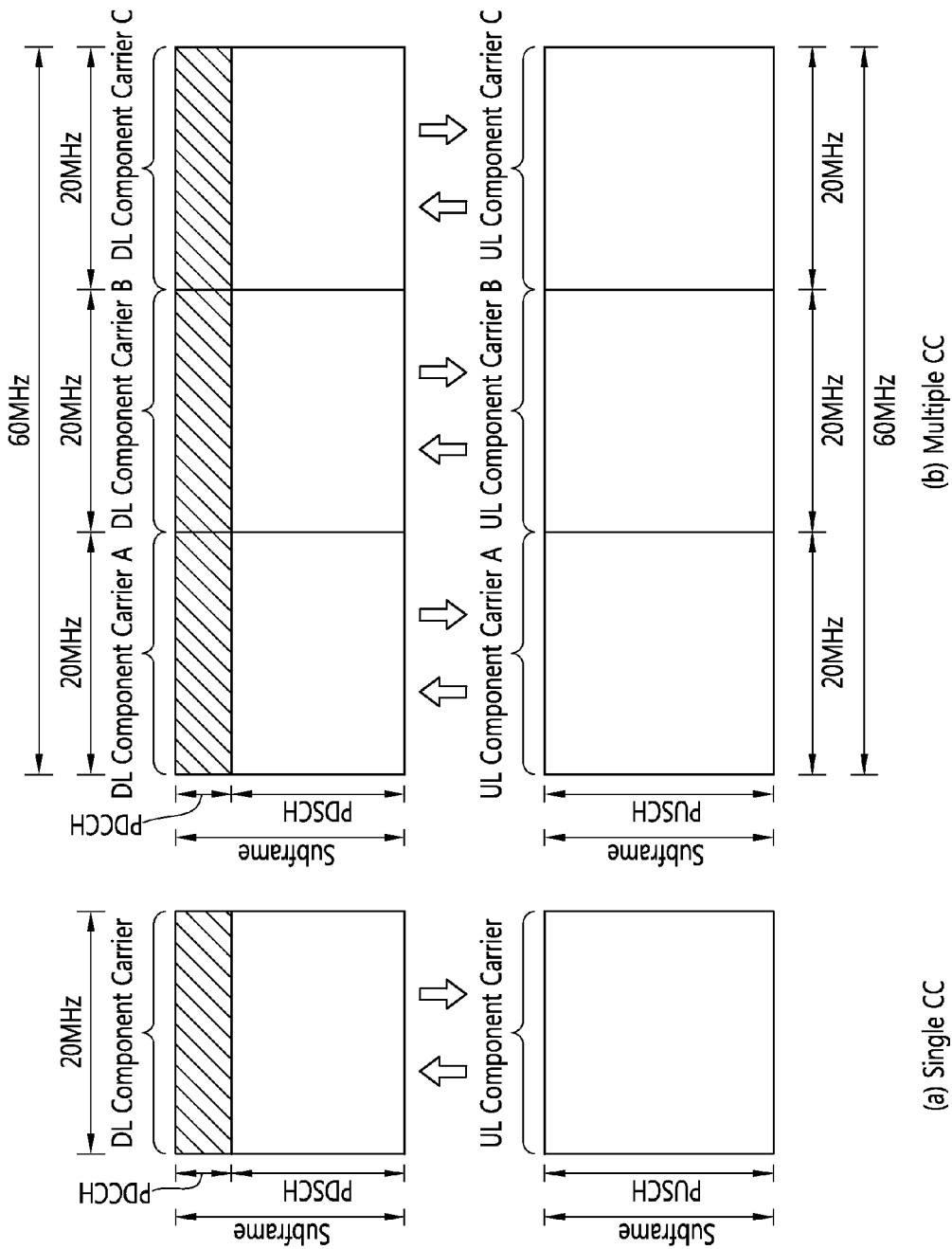
FIG. 8 is an example in which the existing single carrier system is compared with a multi-carrier system.

FIG. 8 is an example in which the existing single carrier system is compared with a multi-carrier system.

Referring to FIG. 8, in the single carrier system, only one carrier is supported for an MS in uplink and downlink. The bandwidth of a carrier may be various, but the number of carriers allocated to an MS is one. In contrast, in the multi-carrier system, a plurality of CCs (DL CCs A to C and UL CCs A to C) can be allocated to an MS. For example, in order to allocate a bandwidth of 60 MHz to an MS, 3 CCs each having 20 MHz may be allocated to the MS.

The multi-carrier system may be divided into a contiguous CA system in which aggregated carriers are contiguous to each other and a non-contiguous CA system in which aggregated carriers are spaced apart from each other. When a multi-carrier system is simply said hereinafter, it is to be understood that the multi-carrier system includes both a case where CCs are contiguous to each other and a case where CCs are not contiguous to each other.

A CC, that is, a target when aggregating one or more CCs may use bandwidths used in the existing system for the purpose of backward compatibility with the existing system. For example, a 3GPP LTE system supports bandwidths of 1.4 MHz, 3 MHz, 5 MHz, 10 MHz, 15 MHz, and 20 MHz. A 3GPP LTE-A system can configure a broadband of 20 MHz or higher using only the bandwidths of the 3GPP LTE system. Or, a 3GPP LTE-A system may configure a broadband by defining new bandwidths without using the bandwidths of the existing system.

The system band of a wireless communication system is classified into a plurality of carrier frequencies. Here, the carrier frequency means the center frequency of a cell. Hereinafter, a cell may mean downlink frequency resources and uplink frequency resources. Or, a cell may mean a combination of downlink frequency resources and optional uplink frequency resources. Furthermore, in general, if a CA is not taken into consideration, one cell may always include uplink and downlink frequency resources that form a pair. In order for packet data to be transmitted and received through a specific cell, an MS first has to complete a configuration for the specific cell. Here, the configuration means a state in which the reception of system information necessary to transmit and receive data to and from the specific cell has been completed. For example, the configuration may include an overall process of receiving common physical layer parameters necessary for the transmission/reception of data, MAC layer parameters, or parameters necessary for a specific operation in the RRC layer. A configuration-completed cell is in a state in which the cell can immediately transmit and receive packet data only it has only to receive information about which the packet data can be transmitted.

A cell of a configuration-completed state may be in an activation or deactivation state. Here, the activation refers to a state in which data is being transmitted or received or a state in which data is ready to be transmitted or received. An MS can monitor and receive the control channel (PDCCH) and data channel (PDSCH) of an activated cell in order to check resources (they may be a frequency, time, etc.) allocated thereto.

Deactivation refers to a state in which traffic data cannot be transmitted or received, but measurement or the transmission/reception of minimum information are possible. An MS can receive necessary System Information (SI) in order to receive packets from a deactivated cell. In contrast, the MS does not monitor or receive the control channel (PDCCH) and data channel (PDSCH) of a deactivated cell in order to check resources (they may be a frequency, time, etc.) allocated thereto.

A cell may be classified into a primary cell, a secondary cell, and a serving cell.

The primary cell means a cell that operates in a primary frequency, a cell in which an MS performs an initial connection establishment procedure or a connection re-establishment procedure with a BS, or a cell that is indicated as a primary cell in a handover process. The secondary cell means a cell that operates in a secondary frequency. The secondary cell is configured once RRC establishment is set up and used to provide additional radio resources.

The serving cell is formed of a primary cell in the case of an MS in which a Carrier Aggregation (CA) has not been configured or to which a CA cannot be provided. If a CA has been configured for an MS, the term 'serving cell' is used to indicate a primary cell and one of all secondary cells or a set of a plurality of secondary cells. That is, a primary cell means one serving cell which provides security inputs and NAS mobility information in an RRC establishment or re-establishment state. At least one cell may be configured to form a set of serving cells along with a primary cell depending on the capabilities of UE. The at least one cell is called a secondary cell. Accordingly, a set of serving cells configured for one MS may be formed of only one primary cell or may be formed of one primary cell and at least one secondary cell.

A Primary Component Carrier (PCC) means a Component Carrier (CC) corresponding to a primary cell. A PCC is a CC through which an MS forms connection or RRC connection with a BS at the early stage from among some CCs. A PCC is a special CC that is responsible for connection or RRC connection for signaling regarding a plurality of CCs and that manages UE context, that is, connection information related to an MS. Furthermore, a PCC is always in the activation state when it is in RRC connected mode after forming connection or RRC connection with an MS.

A Secondary Component Carrier (SCC) means a CC corresponding to a secondary cell. That is, an SCC is a CC allocated to an MS in addition to a PCC and is a carrier extended for additional resource allocation, etc. by an MS in addition to a PCC. An SCC may be divided into the activation or deactivation state.

A downlink CC (DL CC) corresponding to a primary cell is called a downlink Primary Component Carrier (DL PCC), and an uplink CC (UL CC) corresponding to a primary cell is called an uplink Primary Component Carrier (UL PCC). Furthermore, in downlink, a CC corresponding to a secondary cell is called a downlink Secondary Component Carrier (DL SCC). In uplink, a CC corresponding to a secondary cell is called an uplink Secondary Component Carrier (UL SCC).

A primary cell and a secondary cell have the following characteristics.

First, a primary cell is used to transmit a PUCCH. Second, a primary cell is always activated, whereas a secondary cell is a carrier that is activated or deactivated according to specific conditions. Third, when a primary cell experiences a Radio Link Failure (hereinafter referred to as an RLF), RRC re-establishment is triggered, or a secondary cell experiences an RLF, RRC re-establishment is not triggered. Fourth, a primary cell may be changed by a change of a security key or by a handover procedure that is accompanied by a random access channel (RACH) procedure. Fifth, Non-Access Stratum (NAS) information is received through a primary cell. Sixth, a primary cell is always formed of a pair of a DL PCC and an UL PCC. Seventh, a different CC may be configured as a primary cell in each MS. Eighth, procedures, such as the reconfiguration, addition, and removal of a primary cell, can be performed by the RRC layer. In adding a new secondary cell, RRC signaling may be used to transmit system information about a dedicated secondary cell.

A DL CC may form one serving cell, or a DL CC and an UL CC may form one serving cell through connection establishment. However, a serving cell is not formed of only one UL CC. The activation/deactivation of a CC has the same concept as the activation/deactivation of a serving cell. For example, assuming that a serving cell1 is formed of a DL CC1, the activation of the serving cell means the activation of the DL CC1. Assuming that a serving cell2 is configured through connection establishment of a DL CC2 and an UL CC2, the activation of the serving cell2 means the activation of the DL CC2 and the UL CC2. In this sense, each CC may correspond to a cell.

The number of CCs that are aggregated between downlink and uplink may be differently set. A case where the number of aggregated DL CCs is the same as the number of aggregated UL CCs is called a symmetric aggregation, and a case where the number of aggregated DL CCs is different from the number of aggregated UL CCs is called an asymmetric aggregation. Furthermore, the CCs may have different sizes (i.e., bandwidths). For example, assuming that 5 CCs are used to form a 70 MHz band, the 70 MHz band may be configured like 5 MHz CC (carrier #0)+20 MHz CC (carrier #1)+20 MHz CC (carrier #2)+20 MHz CC (carrier #3)+5 MHz CC (carrier #4).

As described above, unlike a single carrier system, a multi-carrier system can support a plurality of Component Carriers (CCs). That is, one MS can receive a plurality of PDSCHs through a plurality of DL CCs.

A multi-carrier system can support cross-carrier scheduling. Cross-carrier scheduling is a scheduling method capable of performing the resource allocation of a PDSCH transmitted through other CCs and/or the resource allocation of a PUSCH transmitted through CCs other than CCs that is basically linked to a specific CC, through a PDCCH transmitted through the specific CC. That is, a PDCCH and a PDSCH may be transmitted through different DL CCs, and a PUSCH can be transmitted through UL CCs other than an UL CC that is linked to a DL CC on which a PDCCH including an UL grant has been transmitted. As described above, a system which supports cross-carrier scheduling requires a carrier indicator for informing that a PDSCH/PUSCH that a PDCCH provides control information are transmitted through what DL CC/UL CC. A field including this carrier indicator is hereinafter called a Carrier Indicator Field (CIF).

A multi-carrier system which supports cross-carrier scheduling may include a CIF in a conventional Downlink Control Information (DCI) format. In a system which supports cross-carrier scheduling, for example, LTE-A system, 1 to 3 bits can be extended because a CIF is added to the existing DCI format (i.e., a DCI format used in LTE). The PDCCH structure may reuse the existing coding method and resource allocation method (i.e., resource mapping based on a CCE).

Figure 9:
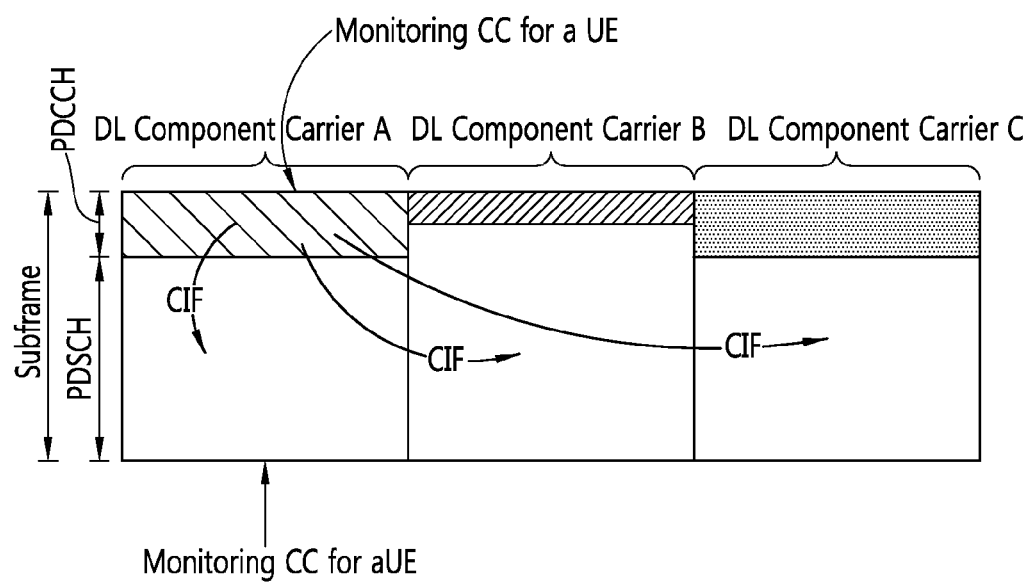
FIG. 9 illustrates the structure of a subframe for cross-carrier scheduling in a multi-carrier system.

FIG. 9 illustrates the structure of a subframe for cross-carrier scheduling in a multi-carrier system.

Referring to FIG. 9, a BS may configure a PDCCH monitoring DL CC set. The PDCCH monitoring DL CC set includes some of all aggregated DL CCs. When cross-carrier scheduling is configured, an MS performs PDCCH monitoring/decoding on only DL CCs that are included in a PDCCH monitoring DL CC set. In other words, a BS transmits a PDCCH for a PDSCH/PUSCH to be scheduled through DL CCs that are included in a PDCCH monitoring DL CC set. A PDCCH monitoring DL CC set may be configured in a UE-specific, UE group-specific, or cell-specific way.

FIG. 9 shows an example in which 3 DL CCs DL CC A, DL CC B, and DL CC C) are aggregated and the DL CC A has been set as a PDCCH monitoring DL CC. An MS can receive DL grants for the PDSCHs of the DL CC A, the DL CC B, and the DL CC C through the PDCCH of the DL CC A. DCI that is transmitted through the PDCCH of the DL CC A includes a CIF, and thus it can indicate that the DCI is DCI for what DL CC.

A method of an MS controlling the transmission power of an uplink control channel in a multi-carrier system is described below.

Method 1.

In the existing wireless communication system, such as LTE, the DCI format of a PDCCH for allocating a DL grant may include a 2-bit TPC field for controlling the power of an uplink control channel, that is, a PUCCH. Likewise, in an improved wireless communication system, such as LTE-A using a plurality of DL CCs/UL CCs, the DCI format of a PDCCH for allocating a DL grant may include a TPC field for controlling the power of an uplink control channel. However, unlike in LTE using one DL CC and one UL CC, in LTE-A, data channels (i.e., PDSCHs) can be received at the same time using a plurality of DL CCs. For this, a plurality of DL grants that schedule the plurality of PDSCHs may be necessary. In this case, how the TPC fields included in the plurality of DL grants will be operated may be problematic. This is because in LTE-A, an uplink control channel, that is, a PUCCH, can be transmitted using only one UL CC (e.g., one UL PCC), the TPC fields included in the plurality of DL grants indicate transmission power control values for one PUCCH.

As a method that may be taken into consideration, there is a method of increasing the control range and granularity of PUCCH transmission power by independently allocating TPC fields to a plurality of DL grants. For example, in LTE, it is assumed that a TPC field included in one DL grant has 2 bits and a power value indicated by the 2 bits is $\{-1, 0, 1, 3\}$[dB]. Here, if 3 DL grants are used in LTE-A, an MS may add the values indicated by the TPC fields included in the 3 DL grants and use the added value to control PUCCH transmission power. Thus, in LTE-A, an MS may determine one of values {−3, −2, −1, 0, 1, 2, 3, 4, 5, 6, 7, 8, 9} [dB] as a PUCCH transmission power value. For example, if a value indicated by the TPC field of a DL grant #1 is 1 [dB], a value indicated by the TPC field of a DL grant #2 is 3 [dB], and a value indicated by the TPC field of a DL grant #3 is 1 [dB], the values indicated by the TPC fields included in the DL grants #1 to #3 are added, and the added value 5 [dB] is determined as the transmission power value of a PUCCH. If this method is used, a range of a PUCCH transmission power value that cannot be represented in LTE can be represented.

In the above example, a case where the range of a PUCCH transmission power value is extended using TPC fields included in a plurality of DL grants has been described, but the range of the same PUCCH transmission power value may be subdivided. For example, if a range of PUCCH transmission power, has been controlled in the unit of 1 [dB] in LTE, the range of PUCCH transmission power may be controlled in a more minute unit, such as 0.5 [dB], in LTE-A.

However, the above-described method may have a problem in a PDCCH discontinuous reception (DTX) situation. For example, a BS has transmitted values indicative of 3 [dB], 3 [dB], and −1 [dB], respectively, in the TPC fields of 3 DL grants, but an MS may receive only the DL grant including the TPC field that indicates −1 [dB] owing to a poor channel condition. That is, the MS has to coordinate its PUCCH transmission power upward to 5 [dB] as the BS has intended, but the MS may coordinate the PUCCH transmission power downward to −1 [dB]. That is, the PUCCH transmission power may be controlled contrary to the intention of the BS.

A method of controlling PUCCH transmission power in a multi-carrier system which can solve this problem is described below.

Figure 10:
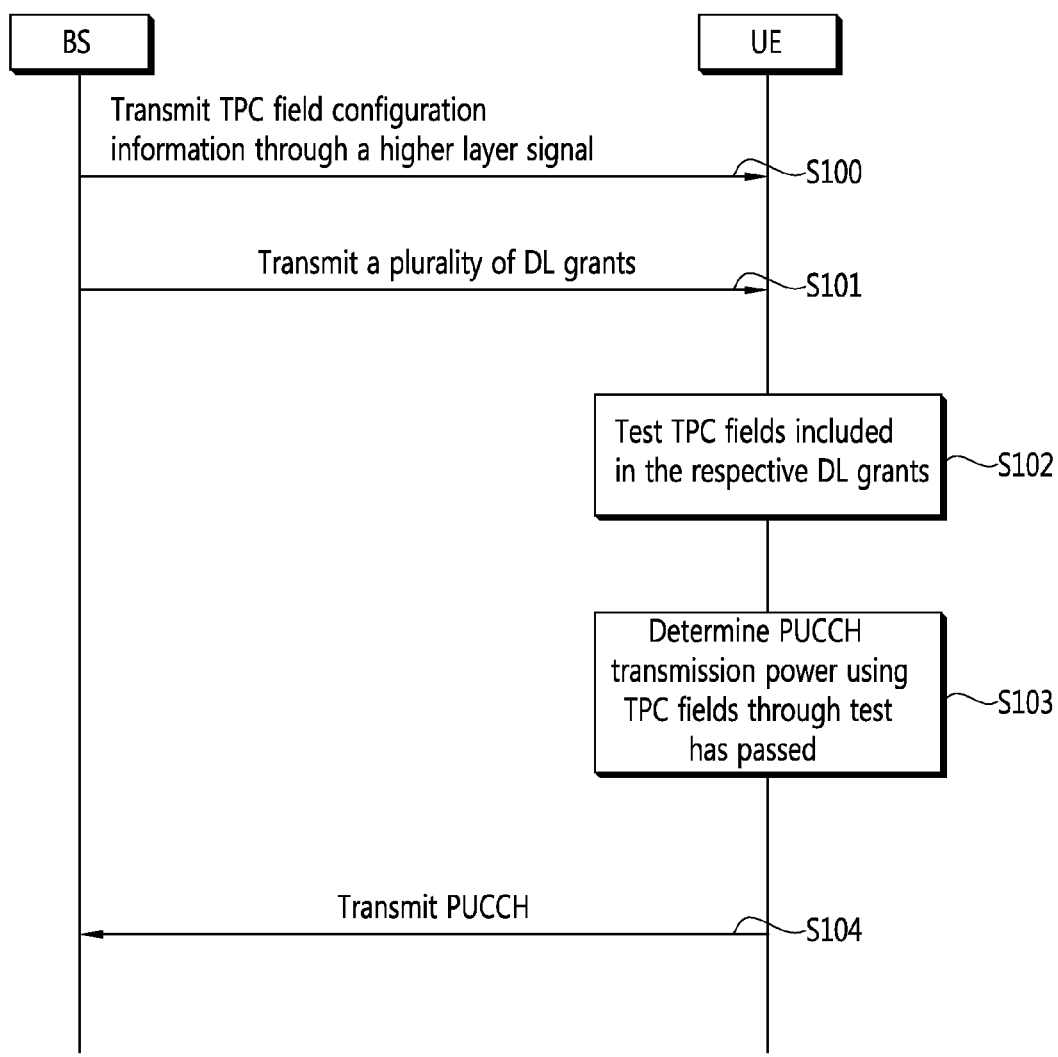
FIG. 10 shows a method of controlling PUCCH transmission power in a multi-carrier system in accordance with an embodiment of the present invention.

FIG. 10 shows a method of controlling PUCCH transmission power in a multi-carrier system in accordance with an embodiment of the present invention.

Referring to FIG. 10, a BS may transmit configuration information about a TPC field, included in a DL grant, to UE through a higher layer signal (S100). For example, the BS may transmit the configuration information about the TPC field, included in the DL grant, through a Radio Resource Control (RRC) message. The configuration information about the TPC field may include information about a sign of a value, a range of a value, a specific value, and a configuration period which may be included in the TPC field.

The BS transmits a plurality of DL grants to the UE (S101). For example, in a multi-carrier system, it is assumed that the number of DL CCs configured to UE is 3 and the number of UL CCs configured for the UE is 1. In this case, a BS may transmit 3 DL grants that schedule the 3 DL CCs. The 3 DL grants may be transmitted through one DL PCC or may be transmitted through a plurality of DL CCs if the number of DL CCs that the UE monitors a PDCCH is plural. In the present embodiment, an example in which a plurality of DL grants is transmitted through one DL PCC is described, but not limited thereto.

Each of the DL grants may include a TPC field. Here, the TPC fields may include only a value of the same sign or '0'. The sign of the value of the TPC field may be determined by configuration information on the TPC field that is transmitted through a higher layer signal. For example, the value of the TPC field may have a sign '+' (i.e., a positive value) or '0' or a sign '−' (i.e., a negative value) or '0'.

Or, the value of the TPC field included in the DL grant may be limited so that it has only some (e.g., two types) values, such as a specific value 'A' or '0'.

That is, the BS may limit the degree of freedom of the value of the TPC field.

The UE tests the TPC fields included in the respective DL grants (S102). In the above example, the UE can inspect the 3 TPC fields included in the 3 DL grants. For example, if the value of a TPC field has been set to have only a positive value or '0', but the value of the TPC field that has been tested has a negative value, the UE treats the corresponding TPC field as a value that has been erroneously transmitted by the BS or a value having an error.

The UE determines PUCCH transmission power using only TPC fields that have passed the test (S103). In the above example, if all the 3 TPC fields have passed the test, the values of the 3 TPC fields are added and a PUCCH transmission power value is determined using the added value. In contrast, in the above example if only two TPC fields have passed the test, the values of the two TPC fields that have passed the test are added and a PUCCH transmission power value is determined using the added value.

The UE transmits a PUCCH based on the determined PUCCH transmission power value (S104).

If the sign of the value of a TPC field that is transmitted by a BS is restricted as in the above method, there are advantages in that UE can easily check whether or not there is an error in the TPC field included in a DL grant and a range of malfunction is limited although some TPC field include error values or a DL grant is not received.

As a modification example of the embodiment, a method of UE selecting only the value of one TPC field having the greatest absolute value when the UE receives a plurality of TPC fields having different signs and controlling PUCCH transmission power based on the value of the TPC field is possible.

Method 2.

A method of using a plurality of the DCI formats 3/3A that is received in a plurality of monitoring DL CCs when the number of PDCCH monitoring DL CCs (hereinafter referred to as monitoring DL CCs as a matter of convenience) through which UE monitors a PDCCH is plural is described below.

In LTE-A, a PUCCH is always transmitted through one UL CC, that is, an UL PCC. If a plurality of the DCI formats 3/3A is received in a plurality of monitoring DL CCs, it may be a problematic in that PUCCH transmission power will be determined according to what method.

Figure 11:
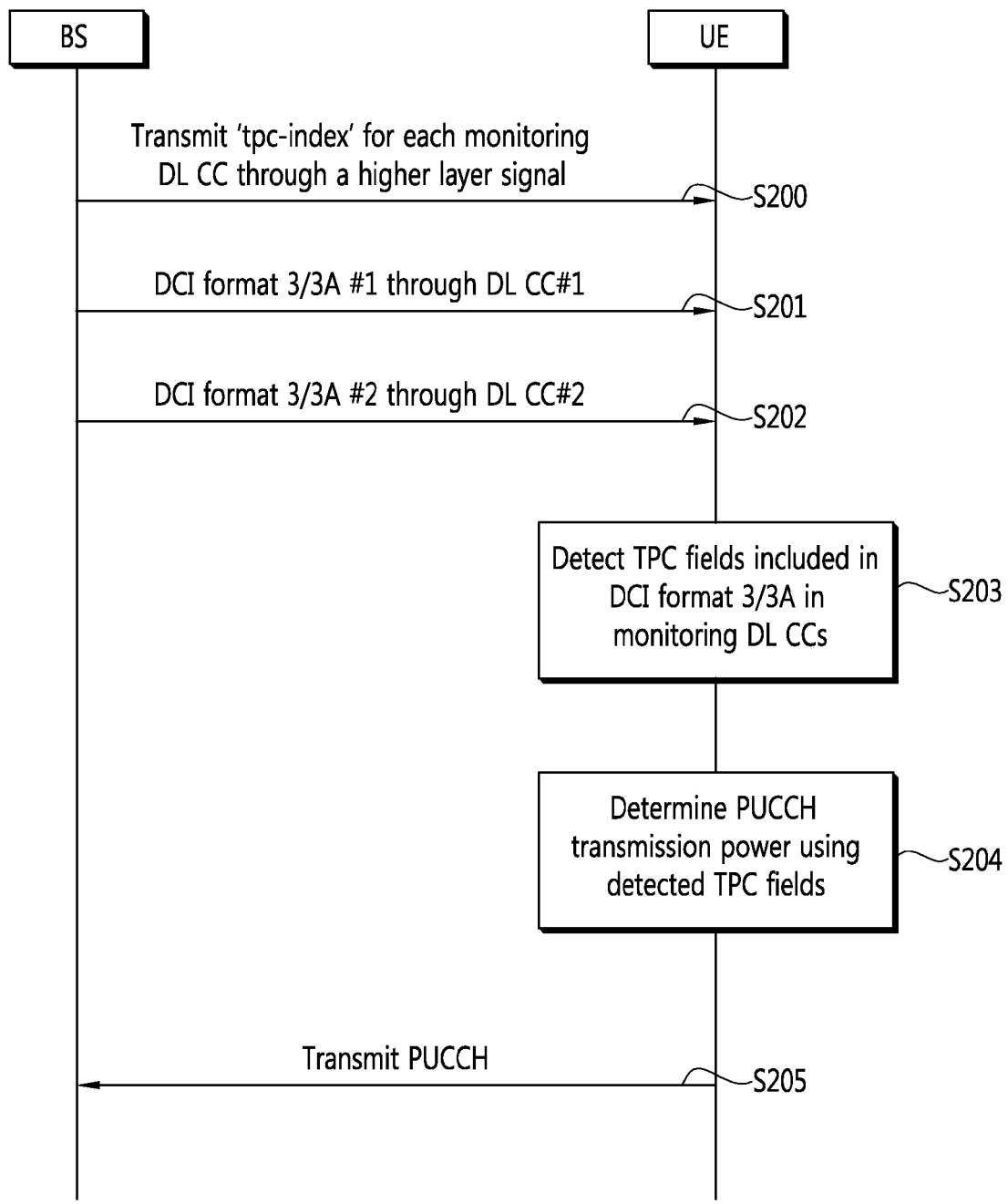
FIG. 11 shows a method of controlling PUCCH transmission power in a multi-carrier system in accordance with another embodiment of the present invention.

FIG. 11 shows a method of controlling PUCCH transmission power in a multi-carrier system in accordance with another embodiment of the present invention.

Referring to FIG. 11, a BS transmits a TPC index (i.e., a parameter 'tpc-index') for each monitoring DL CC through a higher layer signal (S200). The TPC index indicates the index of a TPC field for corresponding UE in a plurality of TPC fields that is included in the DCI formats 3/3A. The UE can know its own TPC field through the TPC index. For example, 5 DL CCs (a DL CC#1 to a DL CC#5) and 3 UL CCs (an UL CC#1 to an UL CC#3) may be configured for the UE. Here, it is assumed that the DL CC#1 to the DL CC#2 are monitoring DL CCs for the UE and the DCI format 3/3A is transmitted through each of the monitoring DL CCs. If the number of monitoring DL CCs is plural as described above, each of the monitoring DL CCs may have a different bandwidth. In this case, the DCI format 3/3A included in each monitoring DL CC may have a different payload size. Accordingly, the BS may designate that what TPC field of the DCI format 3/3A must be decoded for each monitoring DL CC through a higher layer signal, through a TPC index.

The BS transmits the DCI format 3/3A through the monitoring DL CC (S201, S202). In the present embodiment, since it has been assumed that the monitoring DL CCs are the DL CC#1 and the DL CC#2, the BS transmit a DCI format 3/3A #1 and a DCI format 3/3A #2 through the DL CC#1 and the DL CC#2, respectively. Here, the BS may 1) permit TPC fields, transmitted to the same UE, to have the same value. That is, a TPC field allocated to the UE, from among a plurality of TPC fields included in the DCI format 3/3A #1, and a TPC field allocated to the UE, from among a plurality of TPC fields included in the DCI format 3/3A #2, may have the same value.

Or, the BS 2) permits TPC fields transmitted to the same UE to have different values, but may permit the TPC fields to have the same sign or '0' value.

The UE detects its own TPC fields, included in the DCI formats 3/3A, from the respective monitoring DL CCs using TPC indices (S203). Next, the UE determines PUCCH transmission power using the detected TPC fields (S204). In this process, in the case of 1) (i.e., a case where TPC fields transmitted to the same UE through different DL CCs are permitted to have the same value), if all TPC fields allocated to the UE have the same value, the UE may control a PUCCH transmission power value based on the same value or may add the same values of the TPC fields and coordinate the PUCCH transmission power value using the added value. Or, in the case of 1), if the TPC fields allocated to the UE have different values, the UE may disregard its own TPC field values received in all the monitoring DL CCs and coordinate a PUCCH transmission power value using a predetermined and specific value. In other words, if detected TPC fields have different values in the state in which the values of the TPC fields allocated to the UE are set to be identical, the UE may recognize that an error has occurred and disregard the corresponding TPC field values.

Or, in the case of 2) (i.e., the values of TPC fields having the same sign or '0' is configured and allocated to the same UE), the UE may add the values of the TPC fields received through different monitoring DL CCs and determine a PUCCH transmission power value using the added value. Here, if the value of a specific TPC field has a sign (e.g., '−') different from a predetermined sign (e.g., '+'), the UE may add only the values of the remaining TPC fields other than the value of the specific TPC field and determine a PUCCH transmission power using the added value. Or, in the case of 2), if the value of a specific TPC field has a sign (e.g., '−') different from a predetermined sign (e.g., '+'), the UE may determine that an error has occurred, disregard all the TPC fields allocated thereto, and determine a PUCCH transmission power using a predetermined value or determine the PUCCH transmission power using only one TPC field value having the greatest absolute value.

It has been assumed that the number of monitoring DL CCs is plural in the method described with reference to FIG. 11, but not limited thereto. In order to reduce the signaling overhead of a higher layer signal and reduce UE's blind decoding attempts, only one DL CC may be configured as a monitoring DL CC. For example, one monitoring DL CC may be configured as a DL CC liked to an UL PCC (a DL PCC). Accordingly, the UE has only to perform CRC on the DCI formats 3/3A only in the DL PCC. A BS may group UEs which decode the DCI formats 3/3A through the DL PCC and control PUCCH transmission power.

Figure 12:
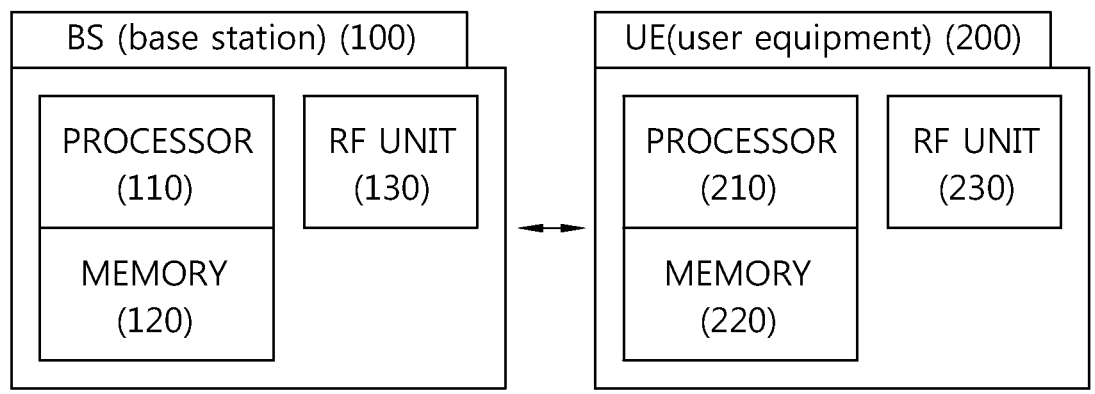
FIG. 12 is a block diagram showing a BS and an MS.

FIG. 12 is a block diagram showing a BS and UE.

The BS 100 processor 110, memory 120, and a Radio Frequency (RF) unit 130. The processor 110 embodies the proposed functions, processes and/or methods. For example, the processor 110 may send configuration information on TPC fields through a higher layer signal, such as an RRC message, and send a plurality of DL grants. The values of TPC fields included in the plurality of DL grants may be set to values described with reference to FIG. 10 or 11. The memory 120 is connected to the processor 110, and it stores various pieces of information for driving the processor 110. The RF unit 130 is connected to the processor 110, and it transmits and/or receives radio signals.

The UE 200 includes a processor 210, memory 220, and an RF unit 230. The processor 210 embodies the proposed functions, processes and/or methods. For example, the processor 210 receives a plurality of DL grants from a BS and tests a Transmission Power Command (TPC) field included in each of the plurality of DL grants. Next, the processor 210 may determine the transmission power of an uplink control channel using only the value of a TPC field through which the test has passed and transmit the uplink control channel using the determined transmission power through one configured UL CC, for example, an UL PCC. The memory 220 is connected to the processor 210, and it stores various pieces of information for driving the processor 210. The RF unit 230 is connected to the processor 210, and it transmits and/or receives radio signals.

The processor 110, 210 may include Application-Specific Integrated Circuits (ASICs), other chipsets, logic circuits, data processors and/or converters for mutually converting baseband signals and radio signals. The memory 120, 220 may include Read-Only Memory (ROM), Random Access Memory (RAM), flash memory, memory cards, storage media and/or other storage devices. The RF unit 130, 230 may include one or more antennas for transmitting and/or receiving radio signals. When the above-described embodiment is embodied in software, the above-described scheme may be embodied using a module (process or function) that performs the above function. The module may be stored in the memory 120, 220 and executed by the processor 110, 210. The memory 120, 220 may be placed inside or outside the processor 110, 210 and may be connected to the processor 110, 210 using a variety of well-known means.

Although the embodiments of the present invention have been described above, a person having ordinary skill in the art will appreciate that the present invention may be modified and changed in various ways without departing from the technical spirit and scope of the present invention. Accordingly, the present invention is not limited to the above-described embodiments and the present invention may be said to include all embodiments within the scope of the claims below.

The invention claimed is:

1. A method of a mobile station controlling transmission power for an uplink control channel in a multi-carrier system in which a plurality of downlink Component Carriers (DL CCs) and at least one uplink component carrier (UL CC) are configured for the mobile station, the method comprising:
   receiving configuration information indicating a sign or value of each of Transmission Power Command (TPC) fields included in a plurality of DL grants, respectively, from a base station;
   receiving the plurality of DL grants from the base station;
   testing the Transmission Power Command (TPC) fields included in the plurality of DL grants, respectively, wherein the testing of the TPC fields is performed by validating information in the TPC fields;
   determining transmission power of an uplink control channel (PUCCH) using a value of a TPC field through which the test has passed; and transmitting the uplink control channel using the determined transmission power through one configured UL CC among the at least one UL CC, wherein the TPC fields included in the plurality of DL grants, respectively, are configured to have an identical sign or a '0' value, wherein the sign indicates a positive value or negative value, and wherein the transmission power of the uplink control channel is determined by adding only values of TPC fields each having a sign identical with a sign indicated by the configuration information, from among the TPC fields included in the plurality of DL grants, respectively.

2. The method of claim 1, wherein the plurality of DL grants is received through a monitoring DL CC on which the mobile station monitors a physical downlink control channel (PDCCH), from among the plurality of DL CCs.

3. The method of claim 2, wherein the monitoring DL CC is a DL CC linked to an UL CC that transmits the uplink control channel.

4. The method of claim 2, wherein:
the monitoring DL CC includes two or more of the plurality of DL CCs, and
the plurality of DL grants are received through each of the two or more DL CCs.

5. The method of claim 4, wherein the TPC fields included in the plurality of DL grants, respectively, are set to have an identical value.

6. A mobile station in a multi-carrier system in which a plurality of downlink Component Carriers (DL CCs) and at least one uplink component carrier (UL CC) are configured for the mobile station, the mobile station comprising:

a Radio Frequency (RF) unit configured to transmit and receive radio signals; and
a processor configured to:
receive configuration information indicating a sign or value of each of Transmission Power Command (TPC) fields included in a plurality of DL grants, respectively, from a base station,
receive the plurality of DL grants from the base station,
test the Transmission Power Command (TPC) fields included in the plurality of DL grants, respectively, wherein the testing of the TPC fields is performed by validating information in the TPC fields,
determine the transmission power of the uplink control channel (PUCCH) using a value of a TPC field through which the test has passed, and
transmit the uplink control channel using the determined transmission power through one configured UL CC among the at least one UL CC,
wherein the TPC fields included in the plurality of DL grants, respectively, are configured to have an identical sign or a '0' value,
wherein the sign indicates a positive value or negative value, and
wherein the transmission power of the uplink control channel is determined by adding only values of TPC fields each having a sign identical with a sign indicated by the configuration information, from among the TPC fields included in the plurality of DL grants, respectively.

7. The mobile station of claim 6, wherein the plurality of DL grants is received through a monitoring DL CC on which the mobile station monitors a physical downlink control channel (PDCCH), from among the plurality of DL CCs.

* * * * *